United States Patent
Sahara

(10) Patent No.: US 8,559,037 B2
(45) Date of Patent: Oct. 15, 2013

(54) IMAGE PROCESSING DEVICE CAPABLE OF EXECUTING A PLURALITY OF JOBS IN PARALLEL

(75) Inventor: Shinya Sahara, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 301 days.

(21) Appl. No.: 12/873,770

(22) Filed: Sep. 1, 2010

(65) Prior Publication Data

US 2011/0051191 A1  Mar. 3, 2011

(30) Foreign Application Priority Data

Sep. 2, 2009  (JP) .................. 2009-202645

(51) Int. Cl.
*G06F 3/12* (2006.01)
*G06K 15/00* (2006.01)

(52) U.S. Cl.
USPC .................. 358/1.15; 358/1.13; 358/1.14

(58) Field of Classification Search
None
See application file for complete search history.

(56) References Cited

U.S. PATENT DOCUMENTS

| | | | |
|---|---|---|---|
| 5,880,851 A | 3/1999 | Imada | |
| 5,970,223 A | 10/1999 | Debes et al. | |
| 6,130,757 A | 10/2000 | Yoshida et al. | |
| 7,031,003 B2 * | 4/2006 | Nagai et al. | 358/1.13 |
| 7,576,881 B2 * | 8/2009 | Kotaka et al. | 358/1.15 |
| 2002/0196475 A1 | 12/2002 | Tanimoto | |
| 2005/0002065 A1 | 1/2005 | Kotaka et al. | |
| 2008/0013123 A1 | 1/2008 | Yoshioka | |

FOREIGN PATENT DOCUMENTS

| | | |
|---|---|---|
| JP | 08-179657 | 7/1996 |
| JP | 10-070624 | 3/1998 |
| JP | 11-003004 | 1/1999 |
| JP | 2000076083 A | 3/2000 |
| JP | 2000-324284 | 11/2000 |
| JP | 2003-169174 | 6/2003 |
| JP | 2003-244353 | 8/2003 |

(Continued)

OTHER PUBLICATIONS

Extended European Search Report dated Sep. 12, 2011 in corresponding European application No. 10007457.4.

(Continued)

*Primary Examiner* — Twyler Haskins
*Assistant Examiner* — Henok Shiferaw
(74) *Attorney, Agent, or Firm* — Banner & Witcoff, Ltd.

(57) ABSTRACT

An image processing device includes an image processing portion, a reception portion, a determining portion and a stopping portion. The image processing portion is configured to execute a plurality of jobs in parallel. Each job requires at least one of a reading process for reading a manuscript, a printing process for printing an image, a facsimile transmission process for transmitting facsimile data and a facsimile reception process for receiving facsimile data. The reception portion is configured to receive a stop request of a job. The determining portion is configured to determine one of a plurality of running jobs as one that is to be stopped when a plurality of jobs are executed at the time of reception of the stop request, and to give a priority to a job that is executed in a state of a high stop emergency degree over a job that is executed in a state of a low stop emergency degree when determining a job that is to be stopped. The stopping portion is configured to stop execution of the job that is determined as one that is to be stopped by the determining portion.

22 Claims, 7 Drawing Sheets

(56) References Cited

FOREIGN PATENT DOCUMENTS

| | | |
|---|---|---|
| JP | 2004-040504 | 2/2004 |
| JP | 2004320717 A | 11/2004 |
| JP | 2008-018622 | 1/2008 |

OTHER PUBLICATIONS

JP Notification of Reasons for Refusal dated Feb. 2, 2012 corresponding Application No. 2009-202645; English Translation.
Notification of Reasons for Refusal for Japanese patent application No. 2009-202645 mailed Jul. 19, 2011.

* cited by examiner

IMAGE PROCESSING DEVICE CAPABLE OF EXECUTING A PLURALITY OF JOBS IN PARALLEL

CROSS REFERENCE TO RELATED APPLICATION

The present application claims priority from Japanese Patent Application No. 2009-202645 filed on Sep. 2, 2009. The entire content of this priority application is incorporated herein by reference.

TECHNICAL FIELD

The present disclosure relates to an image processing device, and particularly relates to an image processing device capable of executing a plurality of jobs in parallel.

BACKGROUND

An image processing device capable of executing a plurality of jobs in parallel is conventionally known. Typically, this device has various functions, such as a printing function, a reading function, a facsimile transmission function and a facsimile reception function. One or more of such functions are used when executing various jobs such as a copying job (the reading function and the printing function), a scanning job (the reading function), a facsimile reception printing job (the facsimile receiving function and the printing function), a PC printing job (the printing function).

However, in the above-described image processing device, when a user wishes to stop one of a plurality jobs that are being executed in parallel, it is difficult to stop the job promptly. More specifically, for example, if processing of all running jobs is stopped when a user presses a stop button, the jobs that are not necessary to be stopped may be stopped. Or, if processing of a job is stopped when a user input a stop instruction after selecting the job that is to be stopped with using an operation panel, it takes time to input a stop instruction and this delays execution timing of stopping of the job.

SUMMARY

An image processing device according to an aspect of the present invention includes an image processing portion, a reception portion, a determining portion and a stopping portion. The image processing portion is configured to execute a plurality of jobs in parallel. Each job requires at least one of a reading process for reading a manuscript, a printing process for printing an image, a facsimile transmission process for transmitting facsimile data and a facsimile reception process for receiving facsimile data. The reception portion is configured to receive a stop request of a job. The determining portion is configured to determine one of a plurality of running jobs as one that is to be stopped when a plurality of jobs are executed at the time of reception of the stop request, and to give a priority to a job that is executed in a state of a high stop emergency degree over a job that is executed in a state of a low stop emergency degree when determining a job that is to be stopped. The stopping portion is configured to stop execution of the job that is determined as one that is to be stopped by the determining portion.

BRIEF DESCRIPTION OF THE DRAWINGS

Illustrative aspects in accordance with the present invention will be described in detail with reference to the following drawings wherein.

DETAILED DESCRIPTION

<Illustrative Aspect>

An illustrative aspect of a multifunction device will be hereinafter explained with reference to FIGS. 1 to 5

The illustrative aspect shows an example where the present invention is applied to a multifunction device 10 (one example of an image processing device) having functions of a scanner, a printer, a copying device and a facsimile device.

(Construction of Multifunction Device and Computer)

Figure 1:
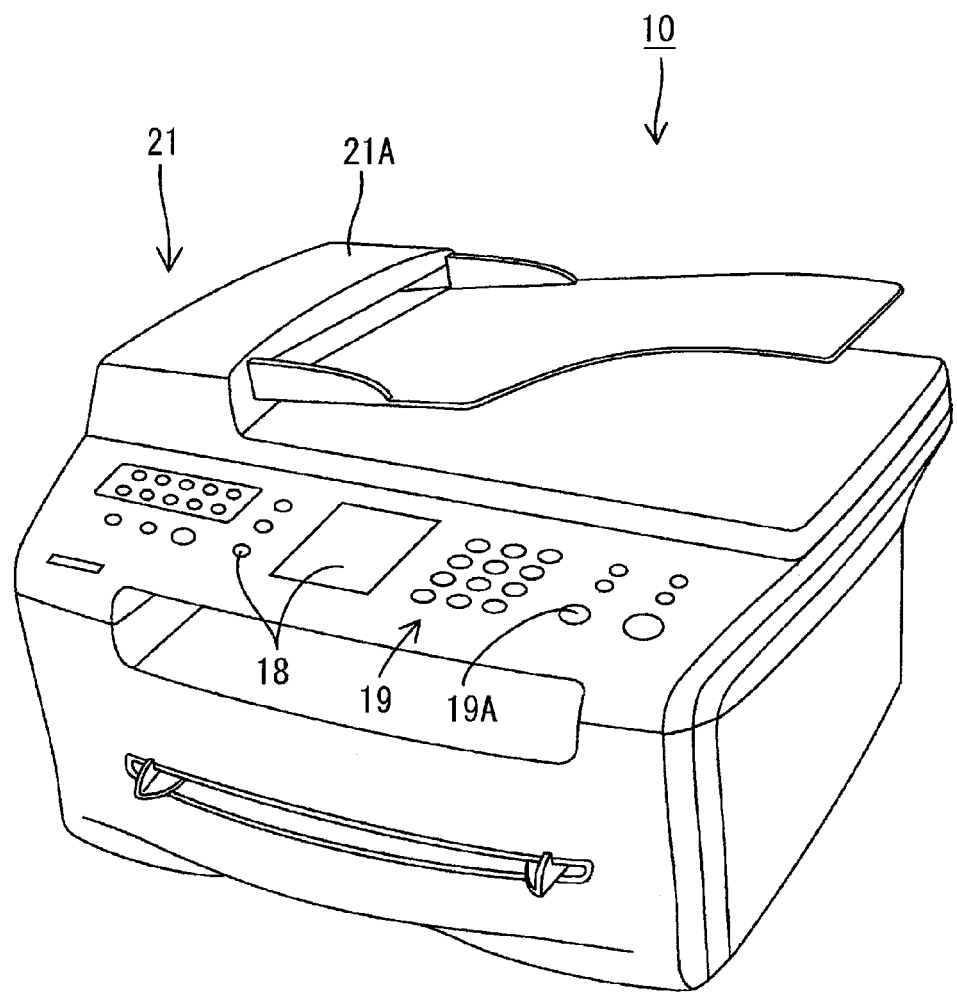
FIG. 1 is a perspective view of an outer appearance of a multifunction device according to one aspect of the present invention.
Figure 2:
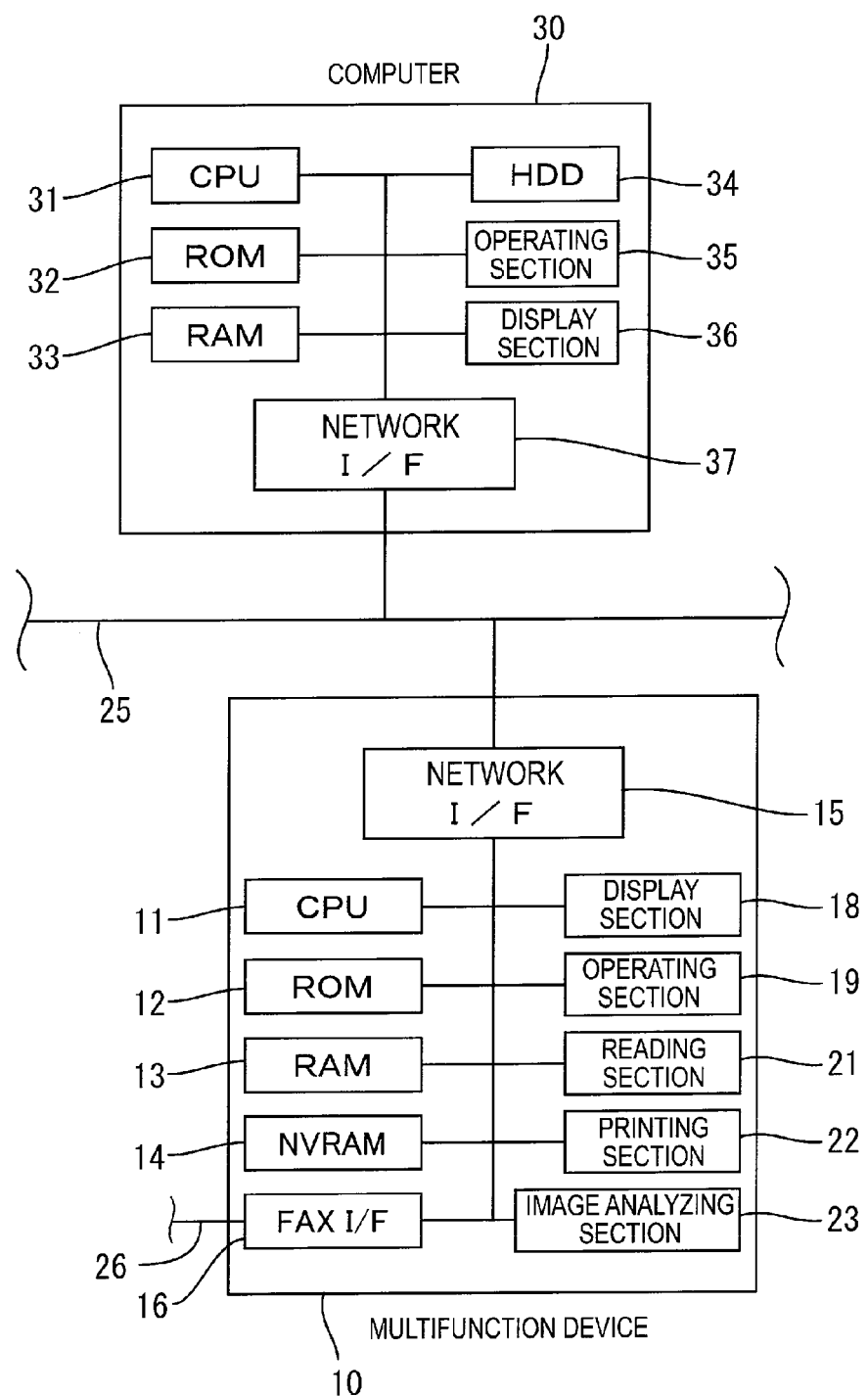
FIG. 2 is a block diagram schematically showing the electrical configuration of the multifunction device and a computer.

FIG. 1 is a perspective view of an outer appearance of the multifunction device 10, and FIG. 2 is a block diagram schematically showing the electrical configuration of the multifunction device 10 and a computer 30.

The multifunction device 10 has a CPU 11, a ROM 12, a RAM 13, a NVRAM (nonvolatile memory) 14, a network interface 15, and a facsimile interface 16, as shown in FIG. 2. The ROM 12 stores programs for executing various operations of the multifunction device 10 including a job stopping process and other processes that will be described later. The CPU 11 (one example of an image processing portion, a determining portion, a stopping portion, a restarting portion) controls each section according to a program read from the ROM 12 with storing processing results in the RAM 13 or the NVRAM 14.

The network interface 15 (one example of a reception portion and a communication portion) is connected to the external computer 30 or other devices via a communication line 25 such as a LAN so as to achieve mutual data communication. The facsimile interface 16 (one example of a communication portion) is connected to a telephone line 26 (one example of a communication line) so as to achieve facsimile data communication (sending and receiving) with external facsimile devices via the facsimile interface 16.

The multifunction device 10 comprises a display section 18 and an operating section 19 as shown in FIG. 1. The display section 18 (one example of an informing portion) comprises a display and an instruction lamp and displays various setting screens and operating conditions of the device. The operating section 19 (one example of a reception portion, a selection reception portion and an operating portion) comprises a plurality of buttons. A user inputs various instructions using the operating section 19. The operating section 19 comprises a stop key 19A for inputting a stop request of a job.

The multifunction device 10 further comprises a reading section 21, a printing section 22 and an image analyzing section 23. The reading section 21 comprises a manuscript feeding device 21A. The reading section 21 sequentially reads the manuscript set on the manuscript feeding device 21A and outputs image data. The printing section 22 prints a color image or a monochrome image on a paper based on printing data.

The image analyzing section 23 is comprised of an ASIC (application specific integrated circuit). The image analyzing section 23 analyzes image data read by the reading section 21, image data received from the computer 30 via the network interface 15 and image data received via the facsimile interface 16 as facsimile data, and determines whether each image data is secret data or not.

Specifically, each image data is collated with a predetermined image pattern (for example, characters, symbols and figures), and if it is determined that image data includes the predetermined image pattern, it is determined that the manuscript has secret data. The image analyzing section 23 may recognize characters of image data with technique of OCR (optical character recognition), and if a specific keyword is included in the image data, it may be determined that the image data is secret data.

The computer 30 comprises a CPU 31, a ROM 32, a RAM 33, a hard disk drive 34, an operating section 35, a display section 36 and a network interface 37. The operating section 35 is comprised of a keyboard and a pointing device. The display section 36 is comprised of a display. The network interface 37 is connected to a communication line 25. The hard disk drive 34 stores applications software for producing image data for printing and various programs for controlling a printer driver that controls the multifunction device 10.

(Operation of Printer)

Figure 3:
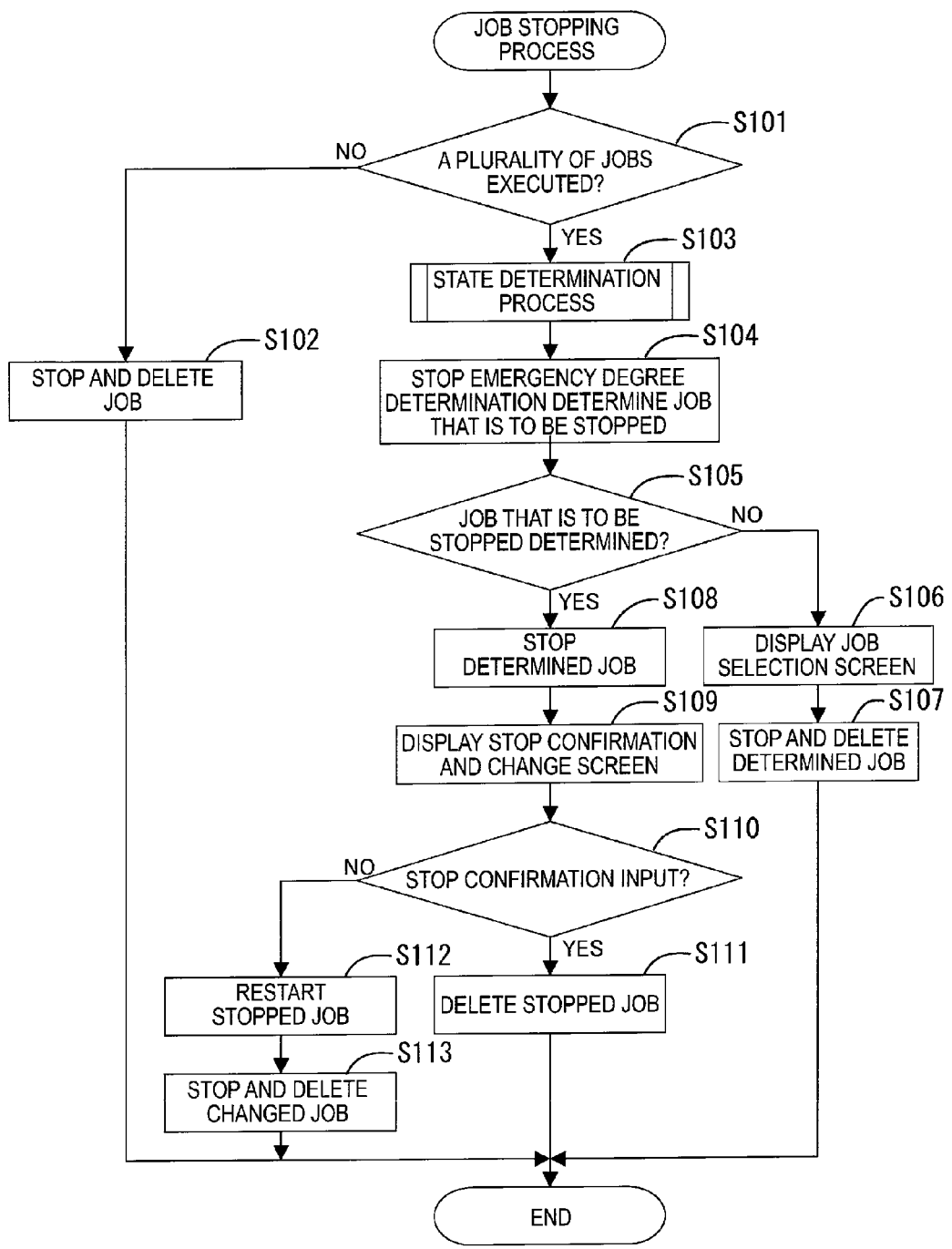
FIG. 3 is a flowchart of a job stopping process.
Figure 4:
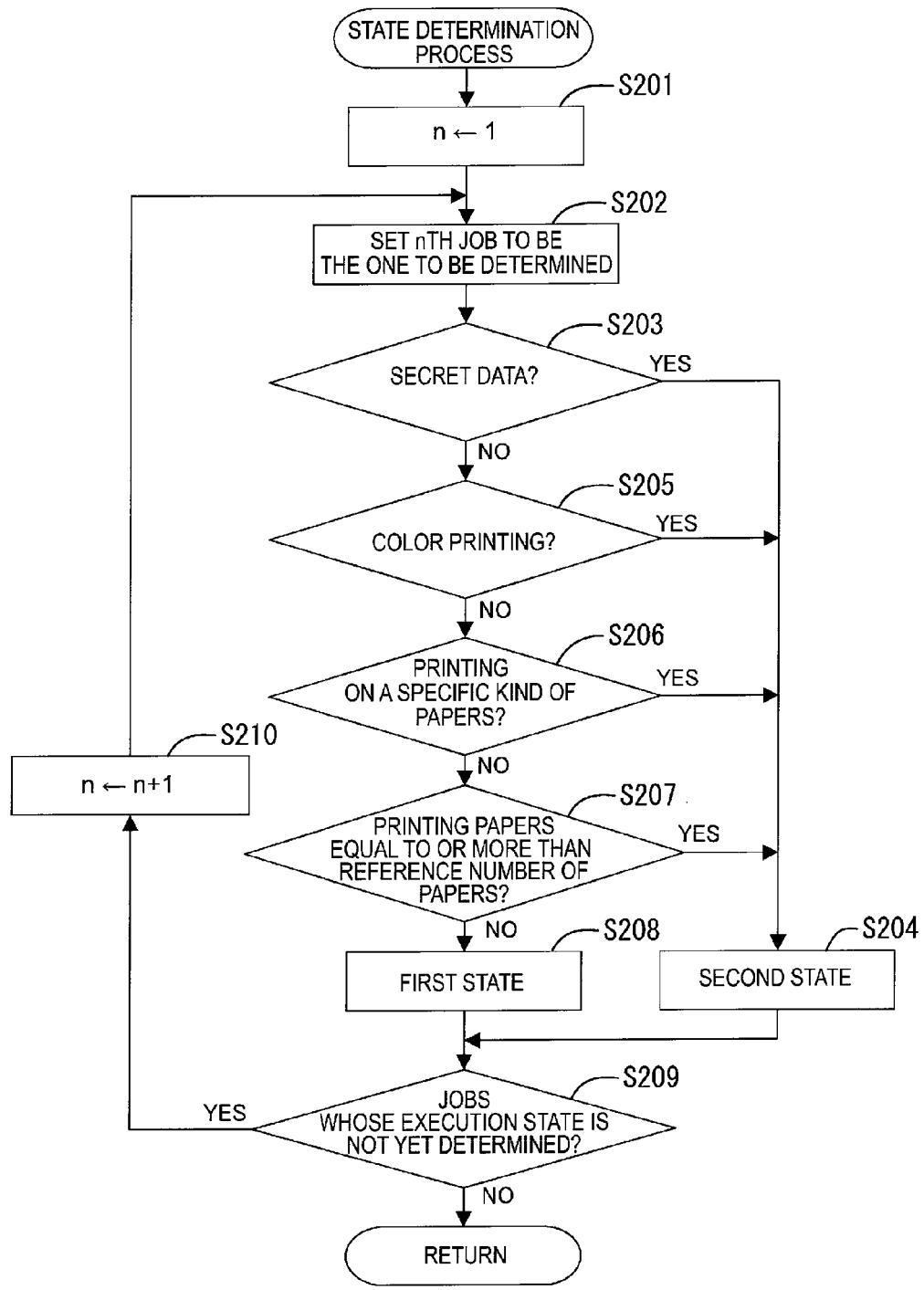
FIG. 4 is a flowchart of a state determination process.
Figure 5:
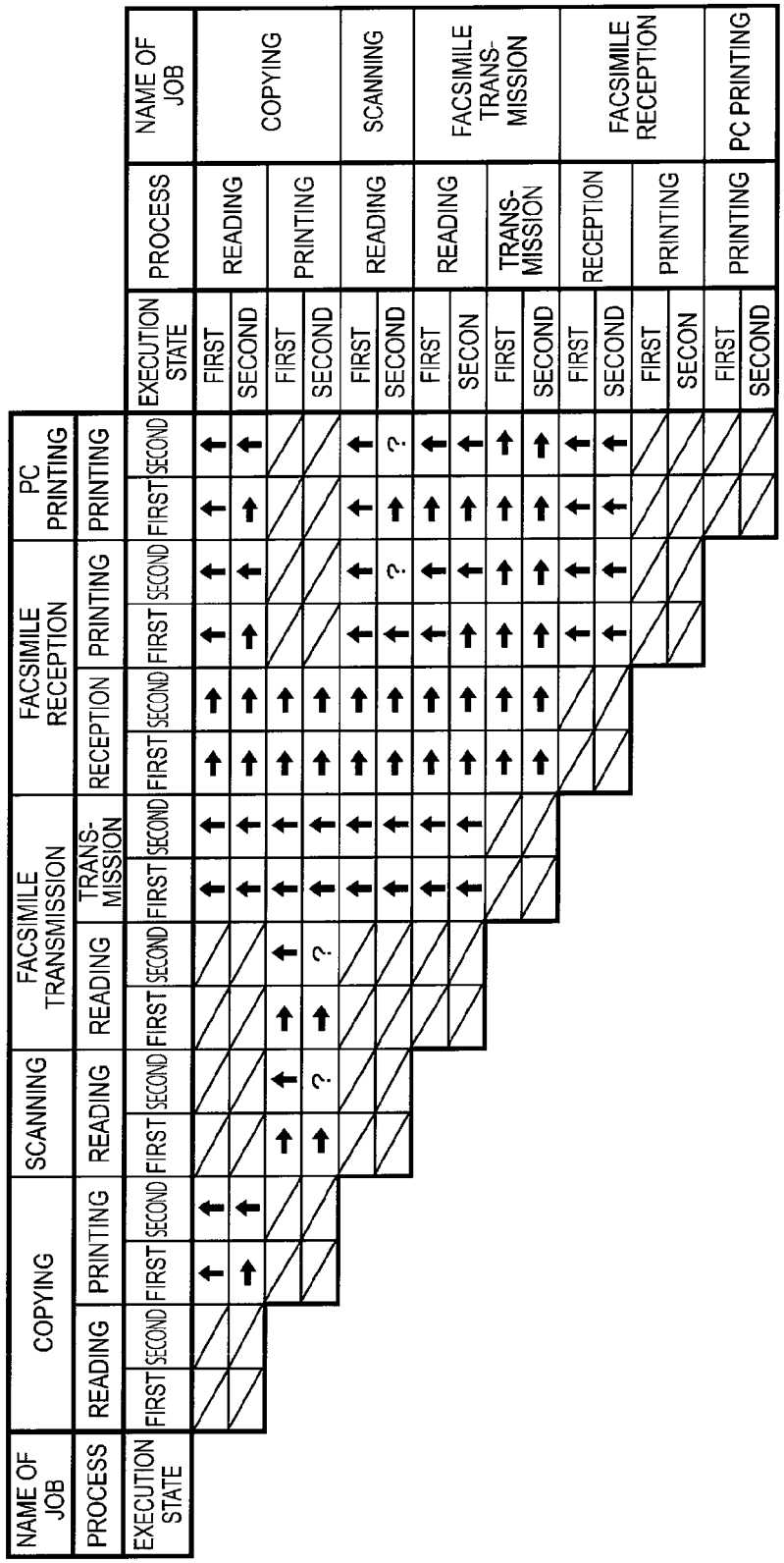
FIG. 5 is a table showing levels of a stop emergency degree of jobs that are executed in parallel.

FIG. 3 is a flowchart of a job stopping process. FIG. 4 is a flowchart of a state determination process. FIG. 5 is a table showing levels of a stop emergency degree of jobs that are executed in parallel.

The multifunction device 10 executes various jobs of, for example, copying, scanning, facsimile transmission, facsimile reception, PC printing and other operations. In a copying job, the reading process and the printing process are executed. In the reading process, a manuscript image is read by the reading section 21 and in the printing process, the read image data is printed by the printing section 22. In a scanning job, the image data read in the reading process is stored in a designated place (such as the hard disk drive 34 of the computer 30 or the NVRAM 14 of the multifunction device 10) as an electronic file.

In a facsimile transmission job, the reading process for reading a manuscript image and the transmission process are executed. In the transmission process, the read image data is transmitted from the facsimile interface 16 as facsimile data. In a facsimile reception job, the reception process and the printing process are executed. In the reception process, facsimile data is received by the facsimile interface 16 and the received facsimile data is stored in the RAM 13. In the printing process, the received facsimile data is printed. In a PC printing job, image data received from the computer 30 via the network interface 15 is printed according to the printing process.

If the CPU 11 of the multifunction device 10 receives an execution request of each of the various jobs via the operating section 19, the network interface 15 or the facsimile interface 16, the CPU 11 registers the job in a queue. Processing of the job registered in the queue is executed according to a registered order in principle and the job is deleted from the queue after execution of the processing. The order of the job may be changed by an interruption function. If a plurality of jobs are registered in the queue and there is a job that can be executed in parallel to the running job, the CPU 11 executes the jobs in parallel.

In the multifunction device 10, two or more different kinds of the four kinds of processes of the reading process, the printing process, the transmission process and the reception process included in each job can be executed in parallel, and two or more processes of one kind of process cannot be executed in parallel. For example, the printing process of a copying job and the reading process of a facsimile transmission job can be executed in parallel, and the reception process of a facsimile reception job and the printing process of a PC printing job can be executed in parallel. On the other hand, the reading process of a copying job and the reading process of a scanning job cannot be executed in parallel, and the printing process of a facsimile reception job and the printing process of a PC printing job cannot be executed in parallel. Further, three or more jobs can be executed in parallel. For example, the printing process of a copying job, the reading process of a scanning job and the reception process of a facsimile reception job can be executed in parallel.

If a user wishes to stop processing of the running job, for example, when the job is executed in a wrong state, a user presses the stop button 19A to input a stop request of the job. The wrong state is caused when a wrong manuscript is set on the reading section 21, or when wrong reading or printing conditions (resolution, the number printing pages, a paper size and so on) are set, or when a wrong transmission destination of a facsimile transmission job is set. If a stop request is input during execution of a job, the CPU 11 executes the job stopping process as follows.

In the job stopping process shown in FIG. 3, the CPU 11 determines whether processing of a plurality of jobs is being executed (S101). If processing of only one job is being executed (S101: No), the CPU 11 stops execution of the job and deletes (cancel) the job from the queue (S102). When processing of only one job is being executed, the job that a user wishes to stop is substantially confirmed. Therefore, even if the job is stopped without any user's confirmation, there is a small possibility to cause a user's unintentional result.

If processing of a plurality of jobs is being executed (S101: Yes), the state determination process is executed (S103). In the state determination process, an execution state of each job is determined for subsequent determination of the stop emergency degree of the job. The stop emergency degree is an index for evaluating an emergency degree that determines stopping of a job for every job that is being executed when the stop request is input. As the disadvantages that a user receives by continuing the job becomes greater, the stop emergency degree becomes higher. The execution state of jobs is defined to be in two steps including a first state and a second state according to the processing content of the job. It is determined whether each job is in the first state or the second state. The second state has a higher stop emergency degree than the first state.

When the state determination process shown in FIG. 4 is started, the CPU 11 sets a counter n to be "1" (S201), and a first one of the running jobs is set to be the one that is to be determined (S202). It is determined whether data of the job that is to be determined is secret data (S203).

To determine whether data of the job that is to be determined is secret data, the CPU 11 controls the reading section 21 to execute pre-scanning when executing the reading process of a copying job, a scanning job and a facsimile transmission job. The pre-scanning is a simplified reading operation that is executed before primary scanning. The primary scanning is executed to read image data that is actually processed. Since the pre-scanning is executed at low resolution, it takes only short time. The image data obtained by the pre-scanning is sent to the image analyzing section 23 to determine whether the data to be processed is secret data. The determination result is stored in the RAM 13.

When processing of a facsimile reception job is executed, facsimile data received in the reception process is sent to the image analyzing section 23, and when processing of a PC printing job is executed, data sent from the computer 30 is sent to the image analyzing section 23. Then, it is determined whether data sent to the image analyzing section 23 is secret data and the determination result is stored in the RAM 13. In the state determination process, the CPU 11 determines whether data of the running job is secret data based on the determination result.

For example, when a user inputs the execution request of a job, information relating to the degree of secrecy may be input and it may be determined whether data is secret data based on the information. In such a case, image analysis by the image analyzing section 23 is not required.

If it is determined that the data of the job is secret data (S203: Yes), the CPU 11 determines that the execution state of the job is in the second state (S204).

If it is determined that the data of the job is not secret data (S203: No), the CPU 11 determines whether color printing is executed for the job (S205). If color printing is executed for the job (S205: Yes), the process proceeds to S204 and it is determined that the execution state is in the second state. If monochrome printing is executed for the job or the job does not require the printing process (S205: No), it is determined whether printing is executed on papers of a specific kind (S206).

Papers of a specific kind include, for example, papers that are more expensive than ordinarily used copying papers. When a user inputs the execution request of a job from the operating section 19 or the computer 30, the CPU 11 recognizes a kind of papers based on setting information relating to papers that is input by a user (a paper size, a discharged tray, a material of papers) and determines whether a designated kind of papers is a specific one. When printing is executed on a paper of a specific kind (S206: Yes), the process proceeds to S204 and the CPU 11 determines that the execution state of the job is in the second state.

When printing of a job is executed on papers that are not of a specific kind or the job does not require the printing process (S206: No), the CPU 11 determines whether the job requires printing of papers equal to or more than a reference number of papers (S207). If the job requires printing of papers equal to or more than the reference number of papers (S207: Yes), the CPU 11 determines that the execution state of the job is in the second state in S204. If the job requires printing of a paper or papers less than the reference number of papers or if the job does not require the printing process (S207: No), the CPU 11 determines that the execution state of the job is in the first state (S208).

After determination of the execution state of the job to be determined, the CPU 11 determines if there are any running jobs whose execution state is not yet determined (S209). If there is a job whose execution state is not yet determined (S209: Yes), the counter n is incremented by one (S210). The process returns to S202 and the same processing is executed for the next job.

If the determination is made for all the running jobs (S209: No), the state determination process is terminated and returns to the main routine.

After the state determination process in S103 of FIG. 3, the CPU 11 compares the levels of the stop emergency degree of each job to determine a job that is to be stopped (S104).

FIG. 5 is a table showing levels of the stop emergency degree of two jobs that are executed in parallel when selecting a job that is to be stopped. The table is stored in the ROM 12 or the NVRAM 14. With reference to the table, one of the two jobs that has a higher stop emergency degree is determined according to the running processing and the execution state of each job, and the determined job has a priority to be stopped. In FIG. 5, a job that is pointed by an arrow represents a job that has a higher stop emergency degree, and a slashed line represents a combination of jobs (processing) that is not executed.

For example, if the reading process of a facsimile transmission job is executed in the first state and the printing process of a copying job is executed in the second state in parallel, the copying job has a priority to be selected. For example, if three jobs are executed in parallel, it is determined whether one of a first job and a second job has a priority according to the table and then it is determined whether one of the selected job and a third job has a priority according to the table. Accordingly, the job that is to be stopped is determined.

As shown in FIG. 5, although there are some exceptions, for one job having a same process, the job is easier to be selected to be stopped when the execution state is in the second state compared to a case in that the execution state is in the first state. For example, when the reading process of a copying job is executed in the first state, it has a priority over only a reception process of a facsimile transmission job. When the reading process of a copying job is executed in the second state, it has a priority over a printing process of a copying job, a printing process of a facsimile reception job and a printing process of a PC printing job that are executed in the first state.

A transmission process of a facsimile transmission job always has a priority to be selected as one to be stopped regardless of the execution state. A reception process of a facsimile reception job is not selected as one to be stopped at any time regardless of the execution state. In FIG. 5, "?" represents a no-selection state in that any one of two jobs has a priority. In other words, in this case, both of the two jobs are executed in the second state and the stop emergency degree of each job is substantially same. Therefore, it is difficult to determine which one of the jobs has a priority to be stopped in the no-selection state.

Next, the CPU 11 determines whether a job that is to be stopped is determined (S105). If it is determined to be in the no-selection state in that a job that is to be stopped is not selected (S105: No), a job selection screen is displayed on the display section 18 (S106). A message of, for example, "please select a job to be cancelled. 1. facsimile transmission 2. copy" is displayed on the job selection screen. In other words, the running jobs are displayed on the job selection screen as the jobs that can be cancelled. A user inputs via the operating section 19 a selection instruction for selecting one of the displayed jobs as one that is to be stopped.

Other than the name of a job, additional information as to the job (for example, a source or a destination of facsimile data and the number of printing pages) may be displayed on the job selection screen. This makes a user to be easier to know what kind of jobs are the ones displayed on the screen.

If the selection instruction is input by a user, the CPU 11 determines the selected job as the one that is to be stopped and stops processing of the job and deletes the job from the queue (S107).

If a job that is to be stopped is determined in S104 (S105: Yes), the determined job is stopped (S108) and a stop confirmation and change screen is displayed on the display section 18 (S109). On the stop confirmation and change screen, the name of the stopped job is shown as a job that can be cancelled and other running job is shown as a job that can be changed to the one to be cancelled. For example, a messages of "Copy job is stopped. Cancel the copy job? Or change job to be cancelled to scanning job?" is displayed on the stop confirmation and change screen. A user inputs via the operating section 19 one of stop confirmation and a change instruction for changing the job that is to be stopped. The change instruction for changing the job that is to be stopped functions as a stop releasing request for the stopped job.

If stop confirmation is input by a user on the stop confirmation and change screen (S110: Yes), the stopped job is deleted from the queue and the job stopping process is terminated (S111). If a change instruction for changing the job to be stopped (a stop releasing request) is input (S110: No), processing of the stopped job is restarted (S112).

If the stopped process is a reading process, the reading operation may be restarted from a portion of a manuscript where the reading operation is interrupted or the reading operation may be started from the beginning of the manuscript again. If the stopped process is a printing process, a printing operation may be restarted from a portion where the printing operation is interrupted or the printing operation may be executed again for a new paper. If the stopped process is a transmission process, facsimile data is transmitted from the beginning again.

Next, the CPU 11 stops the execution of the job that is selected by the change instruction and deletes the job from the queue (S113). Then, the job stopping process is terminated.

According to the illustrative aspect of the multifunction device, when the stop request for stopping a job is received, a job that is executed in the state where the stop emergency degree is high has a priority to be determined as the one to be stopped compared to a job that is executed in the state where the stop emergency degree is low. In other words, a job having a high stop emergency degree that provides great disadvantages to a user by the mistaken execution of the job is easier to be determined as the one to be stopped. Accordingly, processing of a job having a high emergency degree can be stopped promptly. This suppresses generation of disadvantages.

When data of a job is secret data, it is determined that processing of the job is executed in the state having a high stop emergency degree. In other words, when secret data is processed, it is determined that the stop emergency degree is high, the job having secret data has a priority to be selected as the one to be stopped if a stop request is input. Therefore, the job is stopped promptly. This suppresses possibility of leaking of secret information.

Specifically, for example, by stopping a transmission process promptly, transmission of secret data is completely stopped or the amount of secret data that is transmitted can be suppressed to be minimum. By stopping a printing process promptly, printing of secret data on a paper is completely stopped or the amount of secret data that is printed or the number of papers where secret data is printed can be suppressed to be minimum. By stopping a reading process promptly, storing of secret data in the hard disk drive 34 of the computer 30 or the NVRAM 14 of the multifunction device 10 is completely stopped or the amount of secret data that is stored can be suppressed to be minimum.

Generally, a consumed amount of toner or ink is greater in color printing compared to monochrome printing. Therefore, if a stop request is input during the execution of a job that requires color printing, the job has a priority to be selected as the one to be stopped compared to a job that requires monochrome printing and execution of the job is stopped. This suppresses wasted consumption of toner.

For a job that requires a printing process, when a printing operation is executed on a specific kind of papers such as high quality papers, the job has a priority to be stopped compared to a case in that a printing operation is executed on normal papers. This suppresses cost.

When the number of printing pages of a job is great, the job has a priority to be stopped compared to a case in that the number of printing pages is small. This suppresses wasted consumption of papers.

After processing of a job is stopped, processing of the stopped job is restarted when the stop releasing request is received. Therefore, when an unintentional job is stopped by the user's input of the stop request, the stopped job is restarted by inputting the stop releasing request.

If two or more jobs of a plurality of jobs that are being executed at the time of reception of the stop request are executed in the state where the stop emergency degree is high, a selection instruction is received for one of the jobs that are executed in the state where the stop emergency degree is high and the job for which the selection instruction is received can be determined as the one to be stopped. In other words, if a plurality of jobs that are in the state of a high stop emergency degree at the time of reception of the stop request, there may be a case in that it is difficult to automatically select a job to be stopped. In such a case, a job to be stopped is selected by user's selection so as to avoid unintentional stopping of a job.

If a job that requires a facsimile reception process is stopped by mistake during execution of the facsimile reception process, it is difficult to obtain the facsimile data again. Therefore, the job that requires a facsimile reception process is not determined to be stopped during execution of the facsimile reception process.

<Additional Illustrative Aspect>

Figure 6:
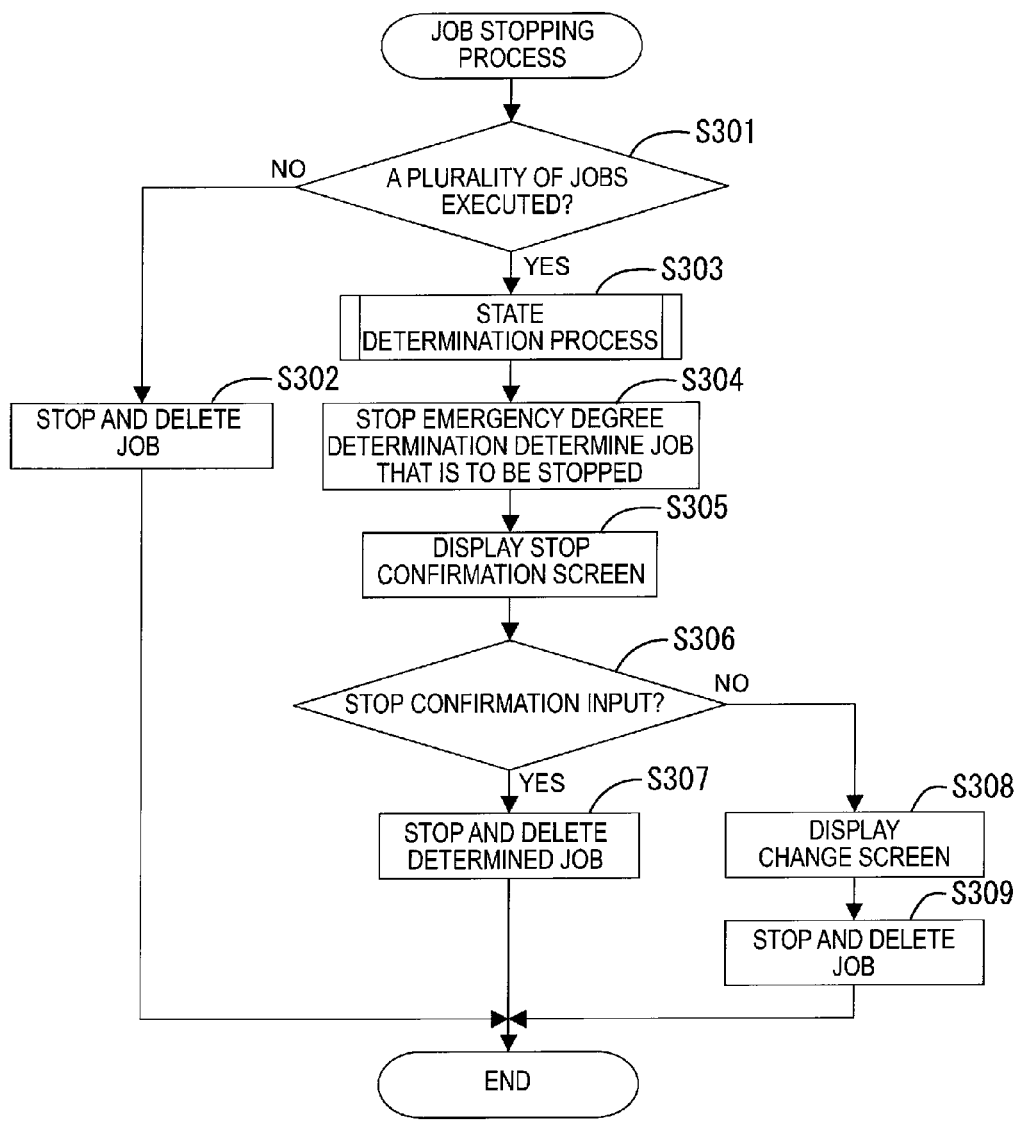
FIG. 6 is a flowchart showing a job stopping process according to another illustrative aspect.

Another illustrative aspect of the multifunction device will be explained with reference to FIG. 6. FIG. 6 is a flowchart showing a job stopping process according to the another illustrative aspect. In the following additional illustrative aspects, a configuration of the multifunction device 10 is same as that of the above illustrative aspect.

If a stop request is input during execution of a job, the CPU 11 starts a job stopping process shown in FIG. 6. In the job stopping process, the CPU 11 determines whether a plurality of jobs are being executed (S301). If only one job is being executed (S301: No), the CPU 11 stops the job and deleted the job from the queue (S302).

In the process of S302, after stopping the job, the CPU 11 may display a message of, for example, "Job is stopped. Cancel job?" on the display section 18. If stop confirmation is input by a user, the CPU 11 may delete the job from the queue and if stop confirmation is not input by a user (if stop cancellation is input), the CPU 11 may restart processing of the job. Or the CPU 11 may display a stop confirmation screen showing the running jobs on the display section 18, and if stop confirmation is input by a user, the CPU 11 may stop the job and deleted the job from the queue.

If a plurality of jobs are being executed (S301: Yes), the CPU 11 executes the state determination process same as that in the above illustrative aspect (S303). The CPU 11 determines the stop emergency degree of a job based on a result of the state determination process and determines a job to be stopped (S304). A level of the stop emergency degree is defined for every job of all combinations of jobs. In other words, a job that has a priority to be determined to be stopped is defined for all combinations of jobs. Therefore, there is no non-selection state ("?") shown in FIG. 5.

Next, the CPU 11 displays the stop confirmation screen on the display section 18 (S305). On the stop confirmation screen, a name of the job that is stopped is shown as the job that can be cancelled. For example, a message of "Copy job is stopped. Cancel copy job?" is displayed on the stop confirmation screen. A user inputs one of stop confirmation (a cancellation instruction) or a selection releasing instruction from the operating section 19.

If stop confirmation is input by a user via the operating section 19 (S306: Yes), the CPU 11 stops the job that is determined to be stopped and deletes the job from the queue (S307). If a selection releasing instruction of the job is input (S306: No), the CPU 11 displays a change screen for changing a job to be stopped on the display section 18 (S308). On the change screen, the running job other than the previously selected job is shown and a change instruction for changing the job to be stopped to the running job can be input. For example, a message of "Cancel PC printing job?" is shown on the change screen. If a change instruction is input, the CPU 11 stops processing of the designated job and deletes the job from the queue (S309).

According to the another illustrative aspect, after determination of the job to be stopped, the job is stopped if stop confirmation is received, and the job is not stopped if stop confirmation is not received. In other words, the job determined to be stopped is not stopped immediately but stopped according to the user's stop confirmation. This avoids unintentional stopping of a job.

A job that is determined to be in the state of a high stop emergency degree has a priority to be determined to be stopped and the determined job is stopped promptly with a user's simple operation compared to other running job. This suppresses generation of user's disadvantages.

<Additional Illustrative Aspect>

Figure 7:
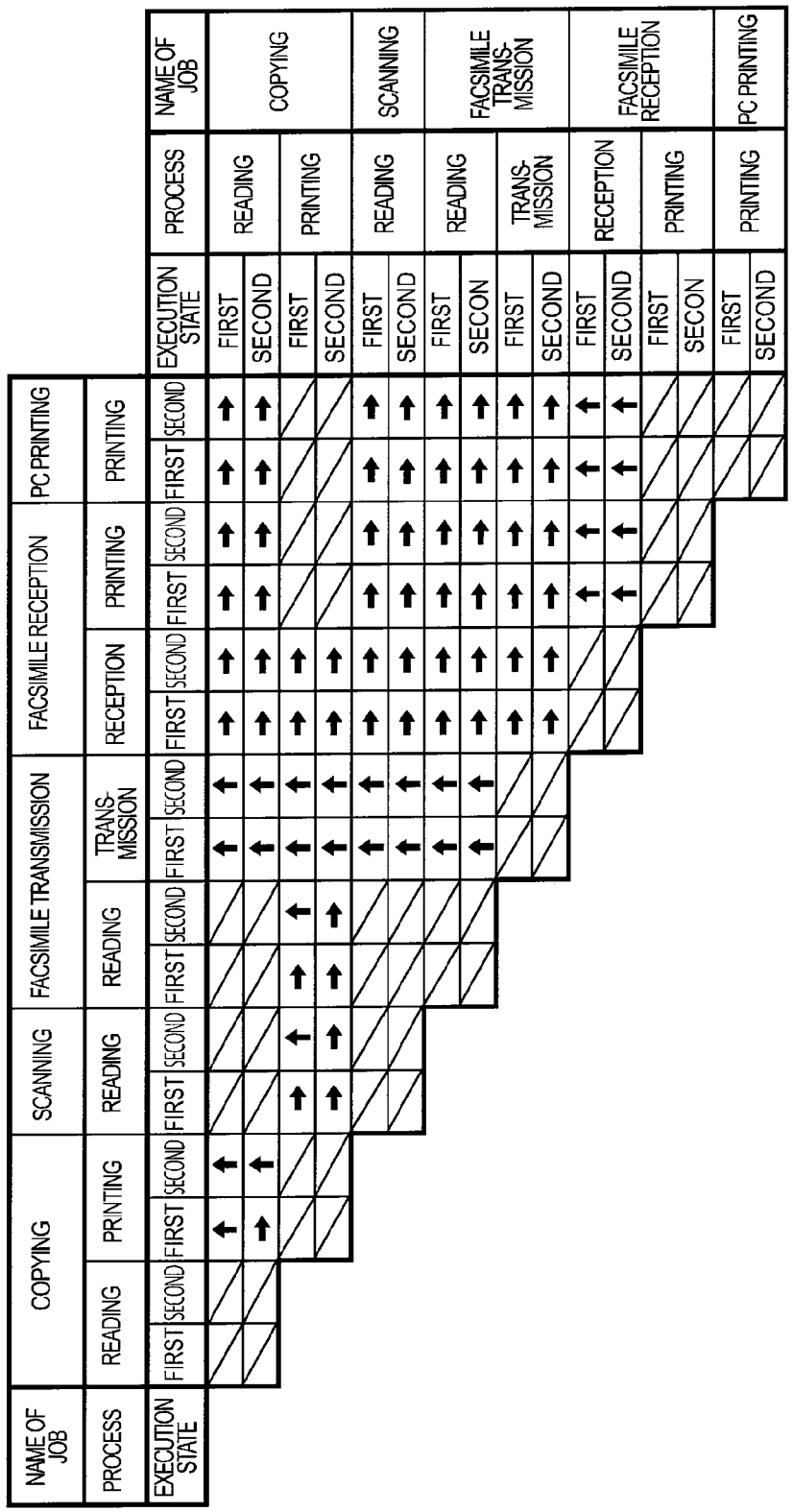
FIG. 7 is a table showing levels of a stop emergency degree of jobs that are executed in parallel according to an additional illustrative aspect.

A further illustrative aspect of the multifunction device will be explained with reference to FIG. 7. FIG. 7 shows a table showing levels of a stop emergency degree of jobs that are executed in parallel.

In the further illustrative aspect, a job to be stopped is determined based on the table shown in FIG. 7 in the job stopping process. Processing of a copying job, a scanning job and a facsimile transmission job is executed based on an execution request input via the operating section 19. Processing of a facsimile reception job is executed based on an execution request input via the facsimile interface 16 and processing of a PC printing job is executed based on an execution request input via the network interface 15.

As shown in FIG. 7, in the further illustrative aspect, when comparing a job for which an execution instruction is input from the operating section 19 and a job for which an execution instruction is input from the facsimile interface 16 or the network interface 15, the former job has a priority to be selected as the job having a higher emergency degree than the latter job. In other words, there is a low possibility that a user who inputs a stop request intends to stop the job that is executed by an execution instruction from an external device. Therefore, a job that is executed by an execution instruction input via the operating section 19 has a priority to be determined to be stopped so as to increase a possibility that a job is selected according to a user's intention.

<Additional Illustrative Aspects>

The present invention is not limited to the aspects explained in the above description made with reference to the drawings. The following aspects may be included in the technical scope of the present invention, for example.

(1) In the above illustrative aspects, the present invention is applied to a multifunction device that executes four kinds of processes including a reading process, a printing process, a facsimile transmission process and a facsimile reception process. However, the present invention may be applied to an image processing device that executes in parallel a plurality of jobs requiring at least one of the four kinds of processes. For example, the present invention may be applied to an image processing device that has no facsimile transmission and reception functions and executes a reading process and a printing process in parallel. Further, for example, the present invention may be applied to a printing device that executes only printing processes for a plurality of jobs in parallel.

(2) In the above illustrative aspects, when a stop request is input, only a running job is selected to be stopped. However, according to the present invention, when a user selects or changes a job to be stopped, a running job and a waiting job may be selected to be stopped.

(3) In the above illustrative aspects, the device executes five kinds of jobs. However, the present invention may be applied to a device that executes jobs other than the five kinds of jobs. For example, the present invention may be applied to a device that comprises a connection section that is connected to an external storing medium such as an USB memory and executes a direct printing job or a scanning to memory job. In the direct printing job, data read from the external storing medium is printed according to the printing process. In the scanning to memory job, data read according to the reading process is written in the external storing medium. Further, the present invention may be applied to a device that executes a job for transmitting data sent from a computer or other devices according to the facsimile transmission process or a job for storing in a memory of a device facsimile data received via a facsimile reception process.

(4) In the above illustrative aspects, a stop request of a job is input by pressing the stop button provided on the device. However, according to the present invention, for example, in a device comprising a touch panel as an operating portion, a stop request may be input by operating the stop button displayed on the touch panel.

Further, for example, a user may transmit a stop request of a job to the multifunction device 10 according to a program (a printer driver, for example) executed by the CPU 31 of the computer 30 shown in FIG. 1, and the CPU 11 of the multifunction device 10 may receive the stop request via the network interface 15. Further, the CPU 11 of the multifunction device 10 may transmit a signal to the computer 30 to display a screen corresponding to the stop confirmation and change screen or the job selection screen on the display section 36, and instructions such as stop confirmation may be transmitted to the multifunction device 10 by an operation of the operating section 35 by a user.

(5) In the above illustrative aspects, in the transmission process of a facsimile transmission job and the reception process of a facsimile reception job, the execution state of a job does not have an effect on the selection of a job to be stopped (the levels of the stopping emergency degree). However, according to the present invention, in the above-described processes, a job executed in the second state may have a priority to be determined to be stopped compared to a job executed in the first state.

(6) In the above illustrative aspects, the execution state of a job is defined to be in two steps including the first state and the second state to determine a level of the stopping emergency degree. However, according to the present invention, the execution state of a job may be defined to be in three steps or more. For example, a job having secret data obtains two points, a job having color printing obtains one point and other job obtains zero point, and an obtained total point of a job may represent the stopping emergency degree. A job having a greatest total point may be selected as the one to be stopped.

(7) Conditions for determining the execution state of a job shown in FIG. 4 may be modified arbitrarily. For example, the determination may be made according to one, two or three of the four conditions shown in FIG. 4 (S203, S205, S206, S207). Or the determination may be made according to other condition.

What is claimed is:

1. An image processing device configured to execute a plurality of jobs in parallel, each job including at least one of a reading process for reading a manuscript, a printing process for printing an image, a facsimile transmission process for transmitting facsimile data and a facsimile reception process for receiving facsimile data, the image processing device comprising:
 a request receiver configured to receive a stop request;
 memory storing:
  a stop priority degree of each process of the plurality of jobs, wherein the facsimile transmission process has a highest stop priority degree, the facsimile reception process has a lowest stop priority degree, and the reading process and the printing process have a middle stop priority degree, and
  an execution state of each of the plurality of jobs, the execution states including a first state in which a job is to be stopped at a first stop emergency degree and a second state in which a job is to be stopped at a second stop emergency degree, the second stop emergency degree being higher than the first stop emergency degree,
  wherein the stop priority degree of each process is stored in relation to the execution state of each job,
 a job receiver configured to receive one or more jobs; and
 a control device configured to:
  determine if a first job and a second job received by the job receiver are being executed in parallel when the request receiver receives the stop request;
  determine if one of the first job and the second job includes the printing process and another one of the first job and the second job includes the reading process;
  determine whether each of the first job and the second job is in the first state having the first stop emergency degree or in the second state having the second stop emergency degree higher than the first stop emergency degree, when determining that one of the first job and the second job includes the printing process and the another one of the first job and the second job includes the reading process;
  when determining that one of the first job and the second job is in the second state, set whichever one of the first job and the second job is determined to be in the second state as a job to be stopped; and
  when determining that one of the first job and the second job does not include the printing process or the reading process, identify which one of the first job and the second job includes a process having a higher stop priority degree and set the identified job as the job to be stopped.

2. The image processing device as in claim 1, wherein:
 the control device determines that at least one job of the plurality of jobs being executed is in the second state when determining that data of the at least one job includes secret data.

3. The image processing device as in claim 1, wherein:
 the control device determines that at least one job of the plurality of jobs being executed is in the second state when determining that the at least one job involves color printing.

4. The image processing device as in claim 1, wherein:
 the control device determines that at least one job of the plurality of jobs being executed is in the second state when determining that the at least one job involves printing on a specific kind of paper.

5. The image processing device as in claim 1, wherein:
 the control device determines that at least one job of the plurality of jobs being executed is in the second state when determining that the at least one job involves printing on a reference number of printing pages or more.

6. The image processing device as in claim 1, wherein:
 the request receiver is further configured to receive a stop releasing request, and the control device is further configured to restart a stopped job when the request receiver receives the stop releasing request after the control device stops the stopped job.

7. The image processing device as in claim 1, further comprising:
 a confirmation portion configured to indicate the job set as the job to be stopped, and to determine whether the request receiver receives a stop confirmation,
 wherein the control device stops the job set as the job to be stopped when the stop confirmation is received by the request receiver, and the control device does not stop the job set as the job to be stopped when the stop confirmation is not received by the request receiver.

8. The image processing device as in claim 1, further comprising:
 a selection reception portion configured to receive a selection instruction indicating a selected job when two or more jobs of the plurality of jobs being executed are in the second state,
 wherein the control device determines that the selected job is the job to be stopped.

9. The image processing device as in claim 1, wherein the control device does not set a job that includes a facsimile reception process as the job to be stopped while the facsimile reception process is being executed.

10. The image processing device as in claim 1, further comprising:
 an operating portion configured to receive a first execution instruction of a third job; and
 a communication portion configured to receive a second execution instruction of a fourth job from an external device via a communication line,
 wherein the control device gives priority to the third job over the fourth job when determining which job to stop so that the third job is stopped before the fourth job.

11. The image processing device as in claim 1, wherein the determination of whether each of the first job and the second job is in the first state or in the second state is based on corresponding processing characteristics of each of the first job and the second job.

12. An apparatus, comprising:
 at least one processor;
 first memory storing:
  a stop priority degree of each process of a plurality of jobs, wherein a facsimile transmission process has a highest stop priority degree, a facsimile reception process has a lowest stop priority degree, and a reading process and a printing process have a middle stop priority degree, and an execution state of each of the plurality of jobs, the execution state including a first state in which a job is to be stopped at a first stop emergency degree and a second state in which a job is to be stopped at a second stop emergency degree, the second stop emergency degree being higher than the first stop emergency degree, wherein the stop priority degree of each process is stored in relation to the execution state of each job; and second memory storing computer-executable instructions that, when executed by the at least one processor, cause the apparatus to:

determine whether a first job and a second job are being executed in parallel in response to receiving a stop request;

determine whether one of the first job and the second job includes the printing process and another one of the first job and the second job includes the reading process;

determine whether each of the first job and the second job is in the first state having the first stop emergency degree or in the second state having the second stop emergency degree higher than the first stop emergency degree, when determining that one of the first job and the second job includes the printing process and the another one of the first job and the second job includes the reading process;

when determining that one of the first job and the second job is in the second state, set whichever one of the first job and the second job is determined to be in the second state as a job to be stopped; and when determining that one of the first job and the second job does not include the printing process or the reading process, identify which one of the first job and the second job includes a process having a higher stop priority degree and set the identified job as the job to be stopped.

13. The apparatus of claim 12, wherein the second memory stores additional computer-executable instructions that, when executed by the at least one processor, cause the apparatus to restart a stopped job if a stop releasing request is received after the stopped job is stopped.

14. The apparatus of claim 12, wherein the second memory stores additional computer-executable instructions that, when executed by the at least one processor, cause the apparatus to:
set one of the plurality of jobs as the job to be stopped;
determine whether a stop confirmation is received; and
after setting the job to be stopped, stop the job to be stopped when the stop confirmation is received and continue the job to be stopped when the stop confirmation is not received.

15. The apparatus of claim 12, wherein the second memory stores additional computer-executable instructions that, when executed by the at least one processor, cause the apparatus to:
receive a selection instruction indicating a selected job when two or more jobs of the plurality of jobs being executed are in the second state; and
determine that the selected job is to be stopped.

16. The apparatus of claim 12, wherein the second memory stores additional computer-executable instructions that, when executed by the at least one processor, cause the apparatus to continue the facsimile reception process when the stop request is received.

17. The apparatus of claim 12, wherein the second memory stores additional computer-executable instructions that, when executed by the at least one processor, cause the apparatus to:

receive a first execution instruction of a third job; and
receive a second execution instruction of a fourth job from an external device via a communication line,
wherein when determining which one of the plurality of jobs being executed to stop, priority is given to the third job over the fourth job so that the third job is determined to be stopped before the fourth job is determined to be stopped.

18. The apparatus of claim 12, wherein the determination of whether each of the first job and the second job is in the first state or second state is based on corresponding processing characteristics of each of the first job and the second job.

19. The image processing device as in claim 1, wherein when determining that one of the first job and the second job includes the printing process and the another one of the first job and the second job includes the reading process, the control device is further configured to:
determine that the first job is the job to be stopped when determining that the first job is in the second state; and
determine that the second job is the job to be stopped when determining that the second job is in the second state.

20. The image processing device as in claim 1, wherein the control device is further configured to:
determine whether one of the first job and the second job includes the facsimile transmission process;
when determining that one of the first job and the second job includes the facsimile transmission process, set whichever one of the first job and the second job is determined to include the facsimile transmission process as the job to be stopped;
determine whether one of the first job and the second job includes the facsimile reception process; and
when determining that one of the first job and the second job includes the facsimile reception process, set whichever one of the first job and the second job is determined to include the facsimile reception process as the job to be stopped.

21. The apparatus of claim 12, wherein the second memory stores additional computer-executable instructions that, when executed by the at least one processor, cause the apparatus to, when determining that one of the first job and the second job includes the printing process and the another one of the first job and the second job includes the reading process:
determine that the first job is the job to be stopped when determining that the first job is in the second state; and
determine that the second job is the job to be stopped when determining that the second job is in the second state.

22. The apparatus of claim 12, wherein the second memory stores additional computer-executable instructions that, when executed by the at least one processor, cause the apparatus to:
determine whether one of the first job and the second job includes the facsimile transmission process;
when determining that one of the first job and the second job includes the facsimile transmission process, set whichever one of the first job and the second job is determined to include the facsimile transmission process as the job to be stopped;
determine whether one of the first job and the second job includes the facsimile reception process; and
when determining that one of the first job and the second job includes the facsimile reception process, set whichever one of the first job and the second job is determined to include the facsimile reception process as the job to be stopped.

* * * * *